Nov. 20, 1928.
W. H. BURTIS
1,692,074
OSCILLATION GENERATOR
Filed April 21, 1927
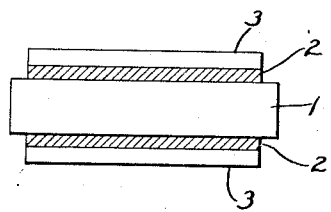
William H. Burtis
Inventor
By Harold Todd
Attorney Patented Nov. 20, 1928.

1,692,074

UNITED STATES PATENT OFFICE.

WILLIAM H. BURTIS, OF PLAINFIELD, NEW JERSEY.

OSCILLATION GENERATOR.

Application filed April 21, 1927. Serial No 185 661.

My invention relates broadly to piezo electric crystals and more particularly to a method and material for mounting the electrodes upon piezo electric crystals.

The object of my invention is to eliminate the blisters formed upon a piezo electric crystal and the subsequent destruction thereof when operated under conditions where the piezo electric crystal is subjected to stresses greater than it will stand under ordinary conditions.

Another object of my invention is the production of a cement of the type that may be used in carrying out the above object.

It has been found that a piezo electric crystal controlled oscillation generator operating with a heavy output current becomes erratic in the production of power and finally refuses to oscillate. This has been found to be due to the production of blisters upon the surface of the piezo electric crystal beneath the electrode.

An attempt has been made to eliminate this blistering by the production of a polished surface upon the piezo electric crystal and further by polishing the surface of the electrode in contact therewith. Although this method of reducing the blistering effect has been effective to some extent, yet when the power of a given oscillator is raised above a certain value the effect of blistering again appears.

I have found that by the use of a cement and by the elimination of all air dielectric between the electrodes and the crystal it is possible to operate a generator under much higher power conditions than is ordinarily possible, without the blistering effect produced upon the surface of the piezo electric crystal.

A crystal of this type is shown in the accompanying drawing in which numeral 1 designates a piezo electric crystal, 2 a layer of cement and 3 a layer of metal or conductive material in intimate contact with the cement.

I have found however that the cement must be of such a quality that it will not contain organic matter, moisture, solvents or other constituents that will yield a gas upon the heating of the crystal, once the cement has set.

Various materials may be used with equally successful results. For example: any of the hydraulic cements, such as dental cement; any of the self-hardening and setting cements that do not contain organic matter, such as, silicate cement, mineral lime, water-glass; or any binder that is non-gas-producing, is inorganic and is free from all solvents that might produce any appreciable amount of gas under the conditions of operation, may be used.

Further, any cement of the type that requires baking may be used if its hardening temperature is lower than the temperature at which the electric properties of the crystal are destroyed.

The method I have used in the production of my crystal unit is to coat the crystal with a layer of cement, and while the cement is in a plastic condition, place upon the surface thereof a metallic conductive coating, such for example a piece of tin-foil. The tin-foil is pressed in such a manner that all air bubbles are removed from between the foil and the cement. The cement is then allowed to harden or if it is a cement of the type that requires baking, the unit is placed in an oven where the cement is lowly hardened.

Another class of cements that I have found advantageous to use is the type of cement that has as its base one of the metals. This type of cement may be used as the electrode and in this manner one may dispense with the separate electrode as direct connection may be made to the cement itself.

This class includes electrolytic deposition of the metal coating upon the crystal to the exclusion of all air pockets between the coating and the crystal.

Further, types of coatings applied without the use of electricity are included in this group. Such coatings, that have been found to be satisfactory in use, are the metallic paints with a binder of inorganic material. It has been found that graphite or bronze powder with silicate of soda, or potash as a binder might be used with exceptional results due to the characteristic property of these particular binders to adhere to the polished surface of piezo electric crystals in general. The metallic powder, I have found, should be ground exceedingly fine and when mixed with the silicate of soda or potash the resultant mixture should be sufficiently thick that upon one coating of the crystal the layer of the metallic paint remaining will be of appreciable thickness.

As the particular case may require the connection may be made directly to the layer of metallic paint, the foil may be pressed thereover, or a layer of metal may be electrolytically deposited thereon for connection as an electrode.

It will be understood that the above description comprehends only the general and preferred embodiment of my invention and that minor detail changes in composition and method of production of the unit above described may be made within the scope of the appended claims without sacrificing any of the advantages of my invention.

Having thus described my invention what I claim is:—

1. A piezo electric crystal upon the surface of which is incorporated a silicate binder and a powdered metal forming the electrode for the crystal 2. A piezo electric crystal upon the surface of which is incorporated a silicate binder and a powdered metal and a layer of electrolytically deposited metal forming the electrode of the crystal.

3. A piezo electric crystal upon the electrode surfaces of which has been incorporated an inorganic binder and a finely powdered conductive material admixed therewith.

4. A piezo electric crystal upon the electrode surfaces of which has been incorporated an inorganic binder and a finely powdered metal admixed therewith.

5. A piezo electric crystal upon the electrode surfaces of which has been incorporated an inorganic binder and a finely powdered metal and over which a layer of metal has been electrolytically deposited 6. A piezo electric crystal upon the electrode surfaces of which has been incorporated an inorganic binder of mineral lime and a finely powdered conductive material and over which a layer of metal has been electrolytically deposited.

W. H. BURTIS.